(12) United States Patent
Osawa et al.

(10) Patent No.: US 7,699,968 B2
(45) Date of Patent: Apr. 20, 2010

(54) WATER PURIFYING SYSTEM

(75) Inventors: Masanobu Osawa, Tokyo (JP); Satoshi Yamada, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 1163 days.

(21) Appl. No.: 11/294,596

(22) Filed: Dec. 6, 2005

(65) Prior Publication Data
US 2006/0096864 A1    May 11, 2006

Related U.S. Application Data

(63) Continuation of application No. PCT/JP2004/007600, filed on Jun. 2, 2004.

(30) Foreign Application Priority Data

Jun. 12, 2003   (JP)   ............... 2003-167967

(51) Int. Cl.
*B01D 61/00*   (2006.01)

(52) U.S. Cl. ............... 204/520; 204/522; 204/533; 204/536

(58) Field of Classification Search ......... 204/630–638, 204/520, 522–523, 533, 536, 553
See application file for complete search history.

(56) References Cited

U.S. PATENT DOCUMENTS 5,833,846 A * 11/1998 Tanabe et al. ............... 210/202
6,379,518 B1 * 4/2002 Osawa et al. ............... 204/524
2002/0125137 A1 * 9/2002 Sato et al. ............... 204/524

FOREIGN PATENT DOCUMENTS

| JP | 8-84986 | 4/1996 |
| JP | 8-89956 | 4/1996 |
| JP | 9-192661 | 7/1997 |
| JP | 9-290275 | 11/1997 |

(Continued)

OTHER PUBLICATIONS

Darbouret Daniel; Kano Ichiro; "Ultrapure Water Blank for Boron Trace Analysis" Journal of Analytical Atomic Spectrometry, vol. 15, No. 10, Oct. 20, 2000; pp. 1395-1399, XP002403560, Royal Society of Chemistry, Cambridge, UK, ISSN: 0267-9477.

*Primary Examiner*—Nam X Nguyen
*Assistant Examiner*—Gurpreet Kaur
(74) *Attorney, Agent, or Firm*—Manabu Kanesaka

(57) ABSTRACT

The present invention provides a water purifying system capable of efficiently producing treated water containing boron at a low concentration. Water to be treated is first fed to the RO membrane apparatus 1 and the passed water is fed through the boron absorptive apparatus 2. Water which was passed through the boron absorptive apparatus 2 and of which boron was thus removed is fed through the electrodeionization apparatus 3. In this manner, water treated by electrodeionization is taken out as treated water. The condensed water of the electrodeionization apparatus 3 may be discharged or returned to the upstream side of the RO membrane apparatus 1 through a return pipe 4 so that the condensed water is added to water to be treated. Suitably used as the absorptive agent accommodated in the boron absorptive apparatus 2 is a boron selective absorptive agent capable of selectively absorbing boron.

3 Claims, 3 Drawing Sheets

FOREIGN PATENT DOCUMENTS

| | | |
|---|---|---|
| JP | 11-188359 | 7/1999 |
| JP | 2000-301145 | 10/2000 |
| JP | 2001-113281 | 4/2001 |
| JP | 2002-205069 | 7/2002 |
| JP | 2004-919 | 1/2004 |

* cited by examiner

WATER PURIFYING SYSTEM

CROSS REFERENCE TO RELATED APPLICATION

This is a continuation application of PCT/JP2004/007600 filed on Jun. 2, 2004.

FIELD OF THE INVENTION

The present invention relates to a water purifying system which is suitably incorporated in an ultrapure water producing system and, particularly, to a water purifying system for producing pure water having a reduced concentration of boron.

BACKGROUND OF THE INVENTION

An ultrapure water producing system generally comprises a pretreatment system, a primary water purifying system, and a subsystem. The pretreatment system comprises a clarification apparatus using such as a coagulation filter, an MF membrane (microfiltration membrane), or a UF membrane (ultrafiltration membrane) and a dechlorination apparatus using such as activated carbon.

The primary water purifying system comprises an RO (reverse osmosis membrane) apparatus, a deaerating membrane apparatus, and an electrodeionization apparatus, thereby removing most of ion and TOC (Total Oxidizable Carbon).

The subsystem comprises an UV apparatus (ultraviolet oxidation apparatus), a nonregenerative-type ion-exchange apparatus, and an UF apparatus (ultrafiltration apparatus), thereby removing trace of ion, particularly removing trace of organic matter of low molecular, and removing microparticles.

Ultrapure water produced in the subsystem is sent to a use point and surplus ultrapure water is commonly returned to a tank of a former stage of the subsystem.

The required quality of ultrapure water has been increased every year. In most advanced electronic industrial field, ultrapure water having boron concentration of 10 ppt or less is presently required.

To produce ultrapure water having such low boron concentration, JP H08-89956A describes that raw water is desalted in a desalter such as an RO membrane apparatus and is then fed through a boron adsorptive resin tower.

JP H09-192661A describes in a paragraph 0040 that as shown in FIG. 3, raw water is treated by feeding the raw water through an RO membrane apparatus 31, an electrodeionization apparatus 32, and a boron adsorptive resin tower 33, in this order.

Electrodeionization apparatuses capable of removing silica and boron are described in JP 2001-113281A (U.S. Pat. No. 6,379,518B1) and JP 2002-205069A (U.S. Pat. No. 6,733,646B2).

When raw water is fed through the RO membrane apparatus 31, the electrodeionization apparatus 32, and the boron absorptive resin tower 33 as shown in FIG. 3, boron is removed both in the electrodeionization apparatus 32 and the boron absorptive resin tower 33, thereby producing treated water having low boron concentration. When the boron absorptive resin tower 33 is arranged in a subsequent stage of the electrodeionization apparatus 32, however, a need of regenerating or exchanging the resin in the boron absorptive resin tower arises at a breakthrough point $P_1$ where a small amount of boron starts to leak as shown in FIG. 2, in order to adjust the boron concentration level in the water flowing out of the boron absorptive resin tower to satisfy a target water quality. That is, the water purifying system of JP H09-192661 has a problem of low production efficiency of pure water because of increased frequency of regenerating or exchanging the boron absorptive resin.

To increase the water recovery rate of the electrodeionization apparatus, it can be considered to return concentrated water of the electrodeionization apparatus to the upstream side of the RO membrane apparatus so that the concentrated water is added into raw water. In this case, water containing boron is circulated between the electrodeionization apparatus and the RO membrane apparatus so that the boron is concentrated therebetween. That is, the boron removing rate of the RO membrane apparatus is about 50% and about half of the boron in the concentrated water from the electrodeionization apparatus passes through the RO membrane apparatus and then enters into the electrodeionization apparatus. As a result of repeating, this process, the boron concentration in water flowing from the RO membrane apparatus to the electrodeionization apparatus is increased. As a result, the boron load on the boron absorptive resin apparatus in a subsequent stage of the electrodeionization apparatus is increased.

SUMMARY OF THE INVENTION

It is an object of the present invention to provide a water purifying system having a desalter such as an RO membrane apparatus, an electrodeionization apparatus, and a boron absorptive resin apparatus, wherein the frequency of regenerating or exchanging the resin of the boron absorptive resin apparatus is significantly lower than that of a conventional apparatus and the water purifying system can provide pure water containing boron at a sufficiently low concentration.

A water purifying system of the present invention comprises a reverse osmosis membrane apparatus, an electrodeionization apparatus, and a boron absorptive apparatus, wherein these apparatuses are connected so that desalted water from the reverse osmosis membrane apparatus is fed through the boron absorptive apparatus and then fed through the electrodeionization apparatus so as to produce pure water.

In the water purifying system of the present invention, for example, after about 80-99% of boron in raw water is removed by the RO membrane apparatus and the boron absorptive apparatus, the water is fed to the electrodeionization apparatus so as to lower the boron concentration to a target level. Since the electrodeionization apparatus is arranged as the final stage and the boron concentration of treated water from the electrodeionization apparatus should reach the target level, the boron concentration of water flowing out of the boron absorptive apparatus arranged before the electrodeionization apparatus may be significantly higher than the target level, for example, may be about a breakthrough point $P_2$ shown in FIG. 2. Accordingly, the frequency of regenerating or exchanging the absorptive agent in the boron absorptive apparatus can be significantly lowered.

In the present invention, the boron absorptive apparatus sufficiently absorbs and removes boron. Therefore, even though concentrated water flowing out of the electrodeionization apparatus is returned to the upstream side of the RO membrane apparatus, boron is not concentrated between the RO membrane apparatus and the electrodeionization apparatus. Therefore, pure water containing boron at a low concentration is obtained.

PREFERRED EMBODIMENTS

Figure 1A:
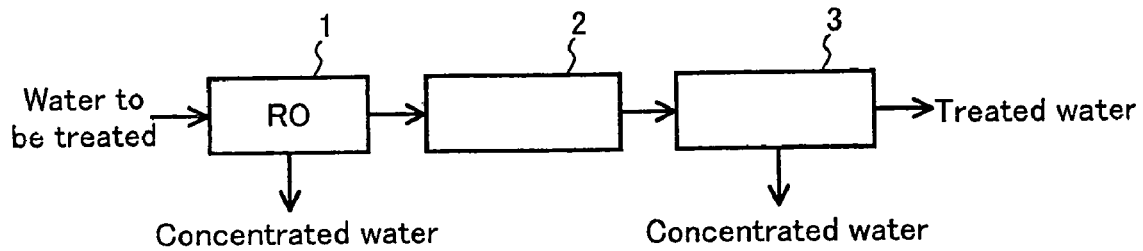
FIGS. 1a and 1b are flow-diagrams of water purifying systems according to embodiments, respectively.

As the electrodeionization apparatus used in the present invention, an electrodeionization apparatus described in JP 2001-113281A (U.S. Pat. No. 6,379,518B1) or JP 2002-205069A (U.S. Pat. No. 6,733,646B2) is suitably used and these will be incorporated here by reference.

The water purifying system described in JP 2001-113281A is an electrodeionization apparatus comprising: a cathode; an anode; concentrating compartments and desalting compartments alternately formed by arranging a plurality of cation exchange membranes and anion exchange membranes between the cathode and the anode; and ion exchangers filled in the desalting compartments, wherein at least one of the thickness of the desalting compartments, the operational electric voltage and/or current, and feed rate SV is set so that product water having pH higher than pH of raw water by 1.0 or more is obtained when the raw water having pH of equal to or less than 8.5 is treated without adding an alkaline agent. It is preferable that a plurality of the electrodeionization apparatuses are connected in series, and at least one of the thickness of the desalting compartments, the operational electric voltage and/or current, and feed rate SV of the foremost electrodeionization apparatus is set so that product water having pH higher than pH of raw water by 1.0 or more is obtained particularly when the raw water having pH of equal to or less than 8.5 is fed thereinto without adding an alkaline agent.

The water purifying system described in JP 2002-205069A is an electrodeionization apparatus comprising: an anolyte compartment having an anode; a catholyte compartment having a cathode; concentrating compartment and desalting compartment formed by arranging anion exchange membranes and cation exchange membranes between the anolyte compartment and the catholyte compartment; ion exchangers filled in the desalting compartment; ion exchangers, activated carbon or electric conductor filled in the concentrating compartment; a means for feeding electrode water into the anolyte compartment and the catholyte compartment, respectively; a concentrated water feeding means for feeding concentrated water into the concentrating compartment; and a means for feeding raw water into the desalting compartment and taking out desalted water, wherein the concentrated water feeding means feeds water containing silica or boron at a lower concentration than that of the raw water into the concentrating compartment from a side near an outlet for the deionized water of the desalting compartment, allows the water to flow out of the concentrating compartment through a side-near an inlet for the raw water of the desalting compartment, and discharges at least a part of concentrated water flowing out of the concentrating compartment to the outside of the system.

In the present invention, it is preferable that the elution amount of TOC from a boron absorptive agent in the boron absorptive apparatus is as little as possible. This is because, though the TOC eluting from the boron absorptive agent can be removed by the electrodeionization apparatus as mentioned above, the electrodeionization apparatus has a limitation of removing amount so that the excess amount of eluted TOC affects the secondary water purifying system as a sequential stage. In the present invention, it is preferable that the amount of TOC eluting from the absorptive agent accommodated in the boron absorptive apparatus in the initial stage of water feeding is 0.8 mg or less, more preferably 0.5 mg or less, per 1 liter volume of the absorptive agent for 1 hour at a point of $1/10$ of the entire feeding water time. The elution amount of TOC from the absorptive agent is defined by the following equation:

The elution amount of TOC (mg/h*L)=[TOC concentration of treated water (ppb)−TOC concentration of water to be treated (ppb)·(water feed rate (L/h))/(filling amount of absorptive agent (L))

The "entire feeding water time" means a feeding water time until the absorptive agent within the boron absorptive apparatus is regenerated or exchanged.

Figure 1B:
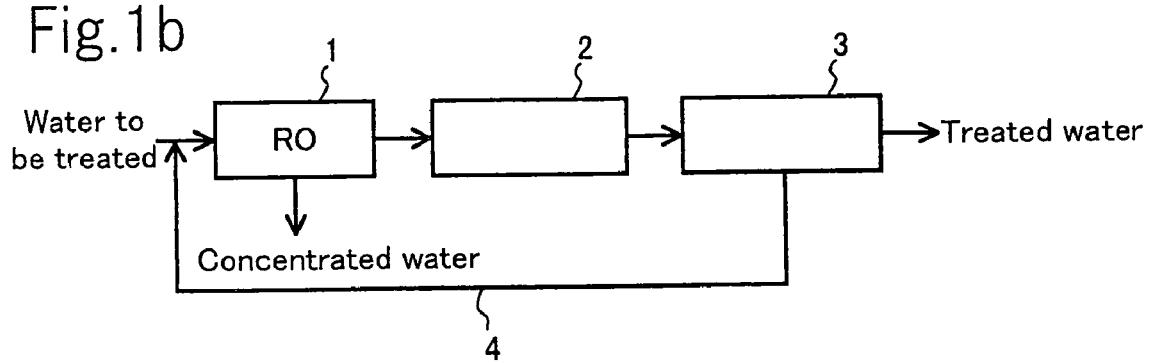

Hereinafter, preferred embodiments will be described with reference to drawings. FIGS. 1a, 1b are flow diagrams of water purifying systems according to embodiments of the present invention.

In FIG. 1a, water to be treated is first fed through the RO membrane apparatus 1 and the passed water is fed through the boron absorptive apparatus 2. Water which was passed through the boron absorptive apparatus 2 and of which boron was thus removed is fed through the electrodeionization apparatus 3. In this manner, water treated by electrodeionization is taken out as treated water. The condensed drainwater in the RO membrane apparatus 1 is discharged. In the embodiment of FIG. 1a, the condensed water in the electrodeionization apparatus 3 is also discharged. Drainwater of electrode compartments in the electrodeionization apparatus 3 is also discharged, but not illustrated.

A water purifying system shown in FIG. 1b is different from the water purifying system shown: in FIG. 1a in that concentrated water in the electrodeionization apparatus 3 is retuned to the upstream side of the RO membrane apparatus 1 through a return pipe 4 so that the concentrated water is added to water to be treated. Other structures of the apparatus shown in FIG. 1b are the same as those of the apparatus shown in FIG. 1a.

Figure 2:
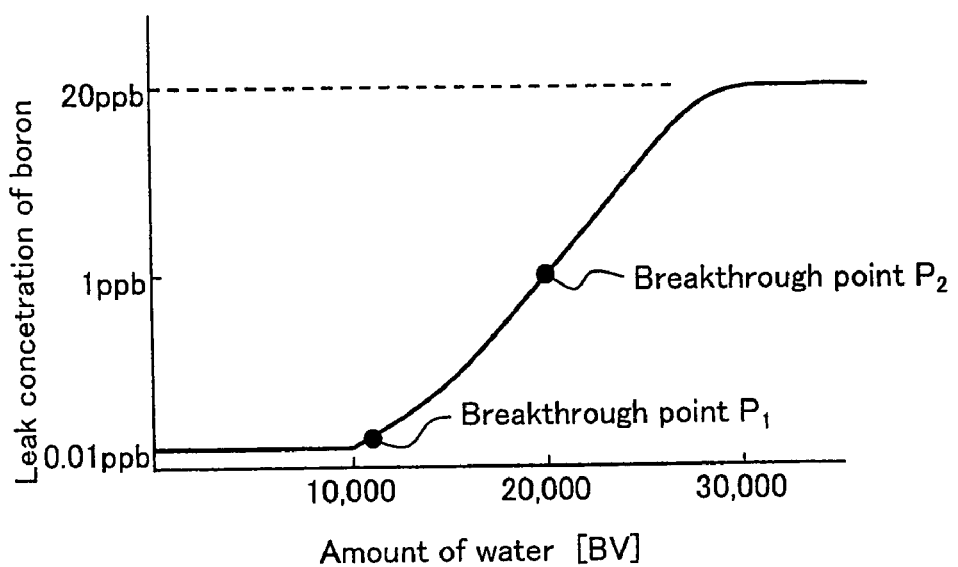
FIG. 2 is a breakthrough curve of boron of a boron absorptive apparatus.
Figure 3:
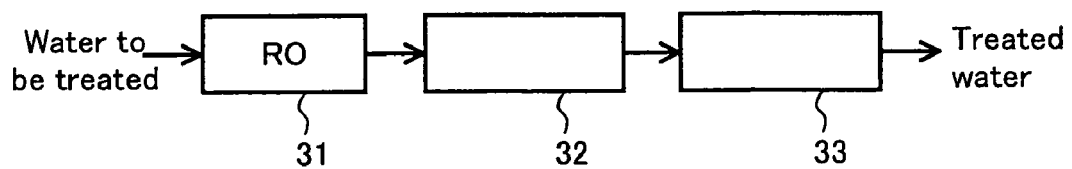
FIG. 3 is a flow diagram of a conventional water purifying system.

In either of the water purifying systems of FIGS. 1a and 1b, water flowing out of the desalting compartment of the electrodeionization apparatus 3 is treated water so that it is only required to satisfy the target water quality by the boron concentration of the water flowing out of the desalting compartment. This means that the boron concentration of water flowing from the boron absorptive apparatus 2 to the electrodeionization apparatus 3 is allowed to be at a level greatly higher than that of the conventional example as shown by the breakthrough point $P_2$ of FIG. 2. Accordingly, the frequency of regenerating or exchanging the absorptive agent in the boron absorptive apparatus 2 can be significantly lowered.

According to the water purifying system of FIG. 1b, the concentrated water of the electrodeionization apparatus 3 is recycled, thereby increasing the water recovery rate. In this case, the boron absorptive apparatus 2 absorbs and removes boron sufficiently. Therefore, even though the concentrated water of the electrodeionization apparatus 3 is returned to the upstream side of the RO membrane apparatus 1, boron never be accumulated in water circulating through a circulating line from the RO membrane apparatus 1 to the electrodeionization apparatus 3, thereby producing treated water with low boron concentration over long periods.

Suitably used as the water to be treated is water which was obtained by removing suspended matter from raw water such as industrial water, city water, or well water and of which boron concentration is about 5-100 ppb, particularly about 10-30 ppb, but not limited thereto. The RO membrane apparatus 1 removes a certain amount of weak electrolyte component such as silica and boron as well as ions, microparticles, and TOC from the water to be treated. The percentage of boron removed by the RO membrane apparatus 1 is on the order of 30-70%.

Suitably used as the absorptive agent accommodated in the boron absorptive apparatus 2 is a boron selective absorptive agent capable of selectively absorbing boron. As the boron selective absorptive agent, a boron selective absorptive agent which absorbs boron by action of ion exchange and a boron selective absorptive agent which absorbs boron by action of chelate can be suitably used. Examples include a boron selective chelating resin "DIAION CRB (available from Mitsubishi Chemical Corporation)", a boron selective chelating fiber "CHELEST FIBER GRY (available from Chelest Corporation)", an anion ion-exchanger "Read-B (available from Asahi Engineering Co., Ltd.)", and the like, but not limited thereto.

As mentioned above, a boron absorptive agent from which the elution amount of TOC is little is suitable. Specifically, it is preferable that the amount of TOC eluting from the absorptive agent accommodated in the boron absorptive apparatus in the initial stage of feeding water is 0.8 mg or less, more preferably 0.5 mg or less, per 1 liter volume of the absorptive agent for 1 hour at a point of 1/10 of the entire feeding water time.

The boron absorptive agent from which the elution amount of TOC is little can be obtained, for example, by washing one of the aforementioned absorptive agents with hot water of 50-90° C. and washing it with alkaline medicine. Alternatively, a product of which the elution amount of TOC is reduced such as "DIAION UCBT02 (available from Mitsubishi Chemical Corporation)" can be used directly.

The boron absorptive apparatus 2 filled with boron selective absorptive agent may be filled with only the absorptive agent mentioned above or filled with the absorptive agent mixed or laminated with other ion-exchangers such as cation-exchange resin and anion-exchange resin or other absorptive agents.

The boron absorptive apparatus 2 may be of "regenerative-type" which can be regenerated by being treated with acidum and/or alkaline medicine or of "nonregenerative type" which is replaced after the breakthrough point of absorption.

The feed rate SV of water to the boron absorptive apparatus 2 is preferably 10-100/hr, particularly 20-50/hr in view of the TOC elution property and frequency of regeneration or the frequency of exchanging absorptive agent.

In the boron absorptive apparatus filled with the boron selective removing absorptive agent, boron is selectively removed. In the present invention, since the electrodeionization apparatus 3, is arranged as a subsequent stage of the boron absorptive apparatus 2, it is not required to make the boron concentration of water flowing out of the boron absorptive apparatus 2 to reach the target concentration of the primary water purifying system and the percentage of boron removed by the boron absorptive apparatus 2 is set to only 80-99%. As for the water quality of water flowing out of the boron absorptive apparatus 2, the water has normally a conductive rate of 0.2-1.0 mS/m, a boron concentration of 0.1-1 ppb, a TOC concentration of 10-50 ppb. By feeding this water to the electrodeionization apparatus, water satisfying the design quality of the primary water purifying system, for example, resistivity>17.5 MΩ·cm, boron concentration<0.01 ppb, TOC<10 ppb can be produced.

Since a major part of boron in water to be treated is removed by the boron absorptive apparatus 2, the load amount of boron on the electrodeionization apparatus is low. Therefore, even though the concentrated water of the electrodeionization apparatus is returned to the upstream side of the RO membrane apparatus as shown in FIG. 1$b$, water circulating from the RO membrane apparatus 1 to the electrodeionization apparatus 3 does not cause a phenomenon of boron concentration.

The electrodeionization apparatus 3 is also called "regeneration-type electric desalting apparatus" and is structured so that spaces defined by anion exchange membranes and cation exchange membranes are filled with ion exchanger to form desalting compartments and concentrating compartments. By applying direct current, ion in water to be treated is removed. Such apparatuses are described in JP H04-72567B, Japanese Patent No. 2751090, Japanese Patent No. 2699256, and JP 2001-239270A.

When the boron concentration must be strictly controlled such as in case of ultrapure water used in electronics industry, it is preferable to use an electrodeionization apparatus having excellent boron removing capability.

Suitably used as this electrodeionization apparatus is an apparatus of which boron removing rate is 80% or more, particularly 90% or more, especially 99% or more.

An example of the water purifying system having high boron removing rate is an electrodeionization apparatus (the water purifying system of JP 2001-113281A (U.S. Pat. No. 6,379,518B1) ) comprising: a cathode; an anode; concentrating compartments and desalting compartments alternately formed by arranging a plurality of cation exchange membranes and anion exchange membranes between the cathode and the anode; and ion exchanger filled in the desalting compartments, wherein at least one of the thickness of the desalting compartments, the operational electric voltage and/or current, and feed rate SV is set so that product water having pH higher than pH of raw water by 1.0 or more is obtained when the raw water having pH of equal to or less than 8.5 is treated without adding an alkaline agent. It is more preferable that another electrodeionization apparatus is connected to the downstream side of said electrodeionization apparatus of the JP 2001-113281A. Specifically, it is preferable that the thickness of the desalting compartments of the former electrodeionization apparatus is 7 mm or more, the ion exchanger filled in the desalting compartments are a mixture of anion exchanger and cation exchanger or anion exchanger, the applied voltage is set to 1-50V/cell, and the feed rate SV is set to 30-150/hr. As the subsequent electrodeionization apparatus, any electrodeionization apparatus may be used. An example of such a multistage electrodeionization apparatus composed of a former electrodeionization apparatus and a subsecuent electrodeionization apparatus is "KCDI-UP (available from Kurita Water Industries Ltd.)". In the multistage electrodeionization apparatus, parts of boron, silica and carbon dioxide are removed by the former electrodeionization apparatus and water treated at the former stage and having pH higher than that of the raw water is fed into the subsequent electrodeionization apparatus so that further parts of boron, silica and carbon dioxide are removed and other ions are removed, thereby improving the boron removing rate.

Another example of suitable electrodeionization is a water purifying system (the water purifying system of JP 2002-205069A (U.S. Pat. No. 6,733,646B2) ) comprising: an anolyte compartment having an anode; a catholyte compartment having a cathode; concentrating compartment and desalting compartment formed by arranging anion exchange membranes and cation exchange membranes between the anolyte compartment and the catholyte compartment; ion exchangers filled in the desalting compartment; ion exchangers, activated carbon or electric conductor filled in the concentrating compartment; a means for feeding electrode water into the anolyte compartment and the catholyte compartment, respectively; a concentrated water feeding means for feeding concentrated water into the concentrating compartment; and a means for feeding raw water into the desalting compartment and taking out desalted water, wherein the concentrated water feeding means feeds water containing silica or boron at a lower concentration than that of the raw water into the concentrating compartment from a side near an outlet for the deionized water of the desalting compartment, allows the water to flow out of the concentrating compartment through a side near an inlet for the raw water of the desalting compartment, and discharge at least a part of concentrated water flowing out of the concentrating compartment to the outside of the system.

The water recovery rate of the aforementioned electrodeionization apparatuses is 60-98%. A part of or whole amount of concentrated water discharged from the electrodeionization apparatus can be returned to the upstream side of the RO membrane apparatus, thereby increasing the water recovery rate of the ultrapure water system.

While the water purifying system of the present invention comprises the RO membrane apparatus, the boron, absorptive apparatus and the electrodeionization apparatus(-es), the water purifying system may be further provided with a deaerator, an activated carbon absorptive apparatus, an ultrafilter membrane apparatus, an ultraviolet germicidal/oxidation apparatus, a nonregenerative-type ion-exchange apparatus, and the like according to the raw water quality of and/or the required treated water quality. In addition, the RO membrane apparatuses and the electrodeionization apparatuses may be structured to have two or more stages. When the raw water is relatively clean or required water quality is low, the ultrapure water system may be constructed without a pretreatment system or a secondary water purifying system.

EXAMPLES

Hereinafter, the present invention will be specifically described with reference to examples and comparative examples. Apparatuses used in the examples and the comparative examples are as follows:

RO membrane apparatus: "Maku-Ace KN" available from Kurita Water Industries Ltd.
Electrodeionization apparatus: "KCDI" or "KCDI-UP" available from Kurita Water Industries Ltd.
Absorptive agent of the boron absorptive apparatus:
"DIAION CBR02" available from Mitsubishi Chemical Corporation
or "DIAION UCBT02" available from Mitsubishi Chemical Corporation,
Filling amount of absorptive agent=50 L
The analyzers used for measurement of boron, TOC, and resistivity are as follows:
Boron analyzer: ICP-MS (available from Yokogawa Electric. Corporation)
TOC analyzer: TOC810 (available from Sievers Company)
Resistivity meter: MX-4 (available from Kurita Water Industries Ltd.)

The raw water (water to be treated) was Nogi city water (pH: 6.9, conductivity: 13 mS/m, boron concentration: 20 ppb, TOC concentration: 500 ppb). The feed rate and the recovery rate are as follows:
Feed rate of raw water: 1 m$^3$/h
Water recovery rate of RO membrane apparatus: 60%
Water recovery rate of electrodeionization apparatus: 85%
For convenience of explanation, the comparative examples will be first described. Table 1 shows changes in water quality with time of treated water produced in the examples and the comparative examples from the start of feeding to 30 days.

Comparative Example 1

Figure 6A:
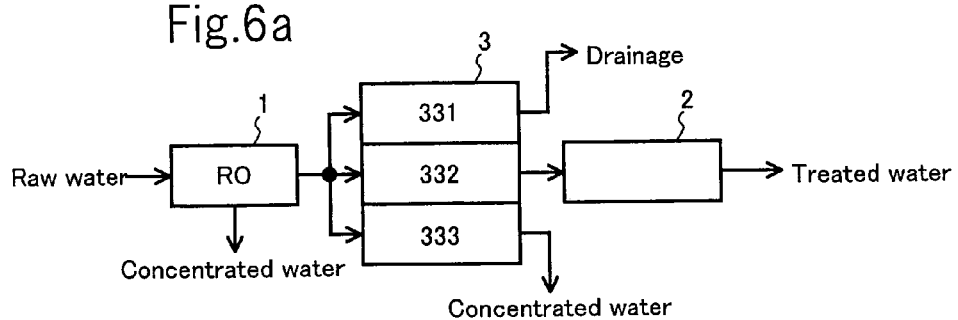
FIGS. 6a and 6b are flow diagrams of water purifying systems of Comparative Examples.

As shown in FIG. 6a, raw water was fed through the RO membrane apparatus 1, the electrodeionization apparatus 3, and the boron absorptive apparatus 2 in this order. Treated water from the RO membrane apparatus 1 was split to flow into a concentrating compartment 333 and an electrode compartment 331 of the electrodeionization apparatus 3. Drainage of the concentrating compartment and drainage of the electrode compartment of the electrodeionization apparatus 3 were discharged. Water desalted by a desalting compartment 332 was fed through the boron absorptive apparatus 2 filled with the boron absorptive agent.

DIAION CBR02 was used as the boron absorptive agent and KCDI was Used as the electrodeionization apparatus 3.

Comparative Example 2

Figure 6B:
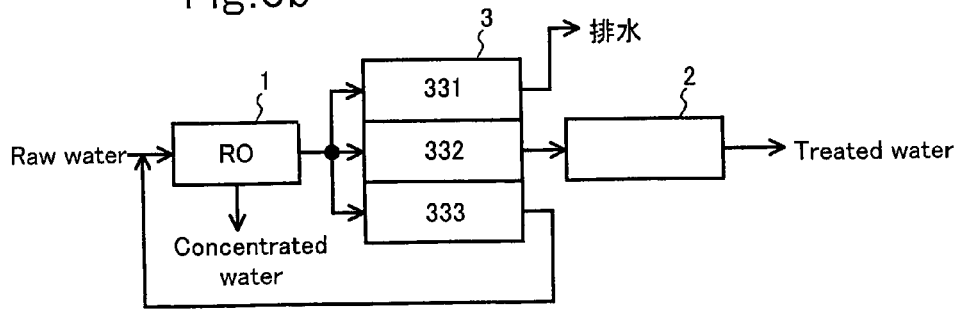

As shown in FIG. 6b, Comparative Example 2 was the same as Comparative Example 1 except that the drainage of the concentrating compartment of the electrodeionization apparatus 3 was returned to the upstream side of the RO membrane apparatus 1.

Example 1

Figure 4A:
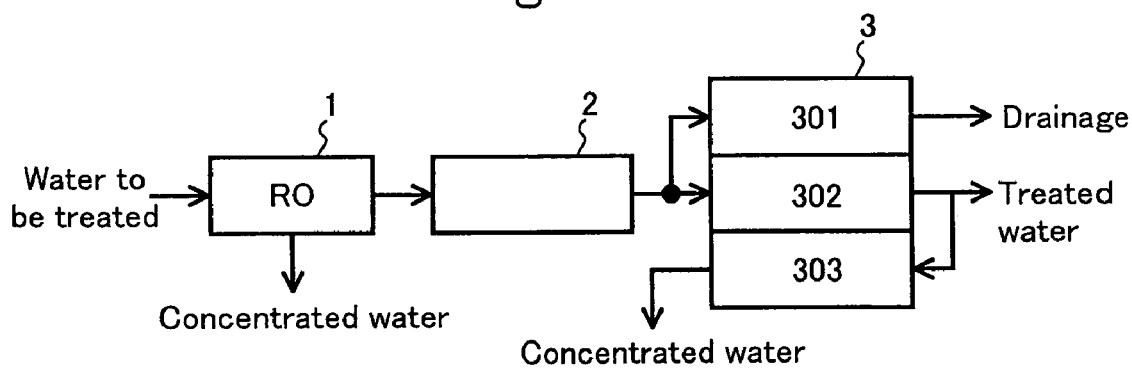
FIGS. 4a and 4b are flow diagrams of water purifying systems of Examples 1 through 4.

As shown in FIG. 4a, raw water was fed through the RO membrane apparatus 1, the boron absorptive apparatus 2, and the electrodeionization apparatus 3 in this order.

Treated water from the boron absorptive apparatus 2 was fed to an electrode compartment 301 of the electrodeionization apparatus 3. Water (treated water) flowing out of a desalting compartment 302 of the electrodeionization apparatus 3 was partially taken to flow into the concentrating compartment 303 of the electrodeionization apparatus 3. Drainage of the concentrating compartment 303 was discharged. Other conditions were the same as those of Comparative Example 1.

Example 2

Figure 4B:
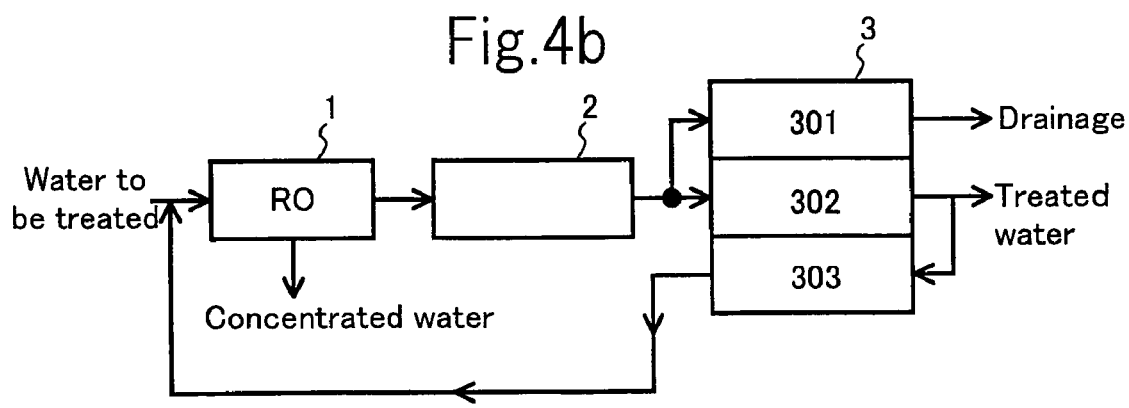

As shown in FIG. 4b, Example 2 was the same as Example 1 except that the drainage of the concentrating compartment of the electrodeionization apparatus 3 was returned to the upstream side of the RO membrane apparatus 1.

Example 3

Example 3 was the same as Example 2 except that DIAION UCBT02 with less elution amount of TOC was used as the boron absorptive agent.

Example 4

Figure 5:
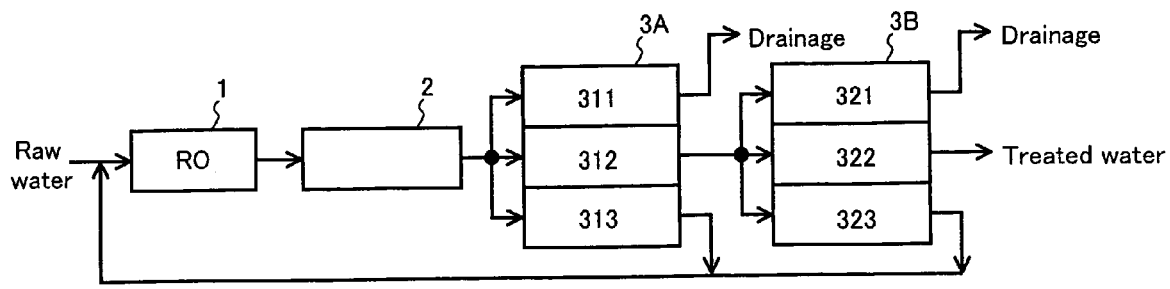
FIG. 5 is a flow diagram of a water purifying system of Example 5.

Two KCDI-UP apparatuses connected in series were used as the electrodeionization apparatus as shown in FIG. 5.

DIAION UCBT02 was used as the boron absorptive agent. Treated water from the boron absorptive apparatus 2 was split to flow into an electrode compartment 311 and a concentrating compartment 313 of a former electrodeionization apparatus 3A. Water flowing out of the desalting compartment 312 was split to flow into an electrode compartment 321 and a concentrating compartment 323 of a subsequent electrodeionization apparatus 3B. Drainage from the concentrating compartments of the electrodeionization apparatuses 3A, 3B is returned to the upstream side of the RO membrane apparatus 1. Other conditions were the same as those of Example 1. Water flowing out of a desalting compartment 322 of the subsequent electrodeionization apparatus 3B was treated water.

employed, the TOC concentration of treated water after a lapse of 10 days was 7.5 ppb. The boron concentration and the resistivity of treated water were well similarly to Examples 1 and 2.

vi) In Example 4, the KCDI-UP was employed as the electrodeionization apparatus. Similarly to Example 3, the boron concentration and the TOC concentration of treated water were low and the resistivity was enough high. It should be noted that the TOC concentration was slightly lower than that of Example 3.

As described in the above, the water purifying system of the present invention can effectively produce treated water containing boron at a low concentration.

TABLE 1

|  |  | Comparative Example | | Example | | | |
|---|---|---|---|---|---|---|---|
| No. |  | 1 | 2 | 1 | 2 | 3 | 4 |
| Flow Diagram |  | FIG. 6a | FIG. 6b | FIG. 4a | FIG. 4b | FIG. 4b | FIG. 5 |
| Kind of DIAION |  | CBR02 | CBR02 | CBR02 | CBR02 | UCBT02 | UCBT02 |
| Kind of KCDI |  | KCDI | KCDI | KCDI | KCDI | KCDI | KCDI-UP |
| Boron concentration of | 1 day | <0.01 | <0.01 | <0.01 | <0.01 | <0.01 | <0.01 |
| treated water (ppb) | 3 days | <0.01 | 3 | <0.01 | <0.01 | <0.01 | <0.01 |
|  | 10 days | <0.01 | 5 | <0.01 | <0.01 | <0.01 | <0.01 |
|  | 20 days | 2 | 10 | <0.01 | <0.01 | <0.01 | <0.01 |
|  | 30 days | 5 | 10 | <0.01 | <0.01 | <0.01 | <0.01 |
| TOC concentration of | 1 day | 150 |  | 65 |  | 25 | 23 |
| treated water (ppb) | 3 days | 120 |  | 50 |  | 15 | 10 |
|  | 10 days | 73 |  | 35 |  | 7.5 | 6.5 |
|  | 20 days | 67 |  | 35 |  | 7.0 | 6.5 |
|  | 30 days | 55 |  | 33 |  | 7.0 | 6.0 |
|  | 1 day | >18.0 | >18.0 | >18.0 | >18.0 | >18.0 | >18.0 |
| Resistivity of treated | 3 days | >18.0 | 17.8 | >18.0 | >18.0 | >18.0 | >18.0 |
| water (MΩ · cm) | 10 days | >18.0 | 17.3 | >18.0 | >18.0 | >18.0 | >18.0 |
|  | 20 days | 18.0 | 17.3 | >18.0 | >18.0 | >18.0 | >18.0 |
|  | 30 days | 17.5 | 17.3 | >18.0 | >18.0 | >18.0 | >18.0 |

Analysis for the test results shown in Table 1 is as follows:

i) The test results of Comparative Example 1 shown that, while the boron concentration of the treated water of the water purifying system was <0.01 ppb at the initial stage of the test, the boron concentration detected from the treated water after a lapse of 20 days was 2 ppb and shows subsequent increasing tendency. In addition of leakage of boron, the resistivity of the treated water was lowered and thus reached 17.5 MΩ·cm after a lapse of 30 days. The TOC concentration of the treated water was high as 73 ppb after a lapse of 10 days and did not reach the allowable concentration of 10 ppb.

ii) In Comparative Example 2, since the concentrated water of the electrodeionization apparatus was returned to the upstream side of the RO membrane apparatus, the boron was concentrated in the system. Thus, the load on the boron absorptive apparatus was increased so that boron leaked into treated water after a lapse of 3 days.

iii) The test results of Example 1 show that the boron concentration of treated water was 0.01 ppb or less even after a lapse of 30 days and the resistivity was 18.0 MΩ·cm or more. However, the TOC concentration of treated water was high as 35 ppb even after a lapse of 10 days.

iv) In Example 2, even though concentrated water of the electrodeionization apparatus was circulated, the boron concentration of treated water was 0.01 ppb or less and the resistivity was 18 MΩ·cm or more. Also in this case, the TOC concentration was high.

v) In Example 3, since the boron absorptive agent (DIAION UCBT02) with less elution amount of TOC was

What is claimed is:

1. A water purifying system consisting essentially of;

a reverse osmosis membrane apparatus, an electrodeionization apparatus consisting of an electrode compartment, a desalting compartment, and a concentrating compartment, and a boron absorptive apparatus, wherein these apparatuses are connected so that desalted water from the reverse osmosis membrane apparatus is fed through the boron absorptive apparatus and then fed to the electrode compartment and the desalting compartment of the electrodeionization apparatus and water from the desalting compartment is partially obtained as so as to produce pure water and partially fed to the concentrating compartment, and the boron absorptive apparatus is filled with absorptive agent of boron absorptive resin, an amount of TOC eluting from the absorptive agent is 0.8 mg or less per 1 liter volume of the absorptive agent per 1 hour at a point of ¹⁄₁₀ of the entire feeding water time from a start to a point of regenerating or exchanging the absorptive agent in the boron absorptive apparatus.

2. A water purifying system consisting essentially of:

a reverse osmosis membrane apparatus;

a boron absorptive apparatus;

an electrodeionization apparatus consisting of an electrode compartment, a desalting compartment, and a concentrating compartment; and a return means for returning concentrated water flowing out of the concentrating compartment to the upstream side of the reverse osmosis membrane apparatus;

wherein these apparatuses are connected so that desalted water from the reverse osmosis membrane apparatus is fed through the boron absorptive apparatus and then fed to the electrode compartment and the desalting compartment of the electrodeionization apparatus and water from the desalting compartment is partially obtained as pure water and partially fed to the concentrating compartment to return to the reverse osmosis membrane apparatus.

3. A water purifying system consisting essentially of:

a reverse osmosis membrane apparatus;

a boron absorptive apparatus; and a plurality of serially connected electrodeionization apparatus, each of the electrodeionization apparatus consisting of:

an electrode compartment;

a concentrating compartment; and a desalting compartment;

wherein these apparatuses are connected so that desalted water from the reverse osmosis membrane apparatus is fed through the boron absorptive apparatus and then split to flow into the three compartments of a foremost electrodeionization apparatus, water flowing out of the desalting compartment of the foremost electrodeionization apparatus being split to flow into the electrode compartment and the concentrating compartment of a subsequent electrodeionization apparatus, and drainage from the concentrating compartments of the foremost and subsequent electrodeionization apparatuses is returned to an upstream side of the reverse osmosis membrane apparatus, whereby pure water flows out of the desalting compartment of the subsequent electrodeionization apparatus is pure water, ion exchangers are filled in the desalting compartments, and at least one of the thickness of the desalting compartments, operational electric voltage and/or current, and feed rate SV is set so that product water having pH higher than pH of raw water by 1.0 or more is obtained when the raw water having pH of equal to or less than 8.5 is treated without adding an alkaline agent.

* * * * *